Feb. 12, 1935.  S. E. FINLEY  1,991,319
ROAD SURFACING COMPOSITION AND METHOD OF MAKING SAME
Filed Aug. 24, 1934
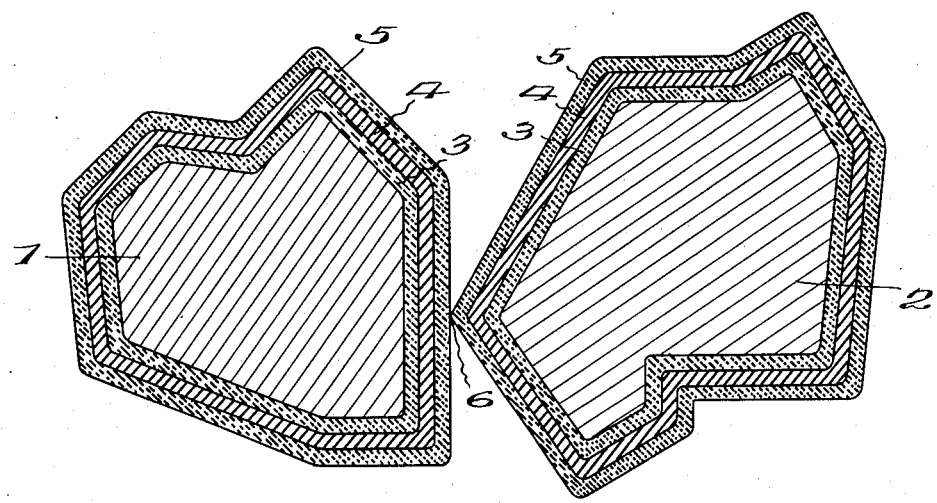
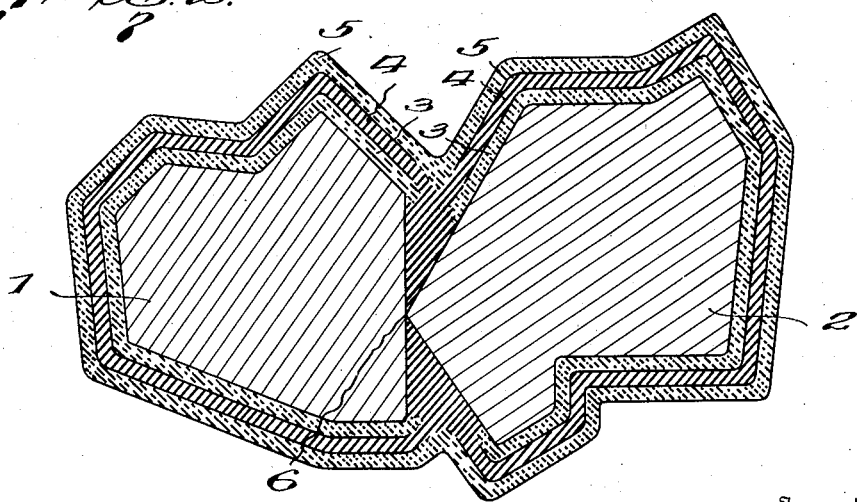
Inventor
Sam E. Finley,
By Church & Church
His Attorneys Patented Feb. 12, 1935

1,991,319

UNITED STATES PATENT OFFICE 1,991,319

ROAD SURFACING COMPOSITION AND METHOD OF MAKING SAME

Sam E. Finley, Atlanta, Ga.

Application August 24, 1934, Serial No. 741,312

8 Claims. (Cl. 106—31)

My invention relates to a new and improved road-surfacing composition and the method of making the same, and has to do, more particularly, with the production of a paving material of the bituminous cement type which can be laid cold and set to form a tough, malleable, durable, wear-resistant and water-excluding pavement by the application of pressure thereto at ordinary atmospheric temperatures. My present invention is an improvement upon that disclosed in United States Letters Patent No. 1,845,405, issued to me on February 16, 1932.

The main object of my present invention is to provide an improved road-surfacing composition, or bituminous paving product, of the cold-mix type, that is to say, of the type which can be readily handled, worked, and spread into place at ordinary atmospheric temperatures, and which will be caused to set-up or amalgamate to form a tough, durable, and wear-resisting surface by the application of pressure thereto at such ordinary atmospheric temperatures, which shall have greater workability and mobility than those heretofore known and shall be capable of manufacture at lower cost, but which, nevertheless, will set up under pressure applied thereto, at ordinary atmospheric temperatures, to form a tough, malleable, durable, wear-resistant and water-excluding pavement.

The objects which I seek to attain by my present invention may be made more clearly apparent by a general consideration of the function of bitumen or bituminous cement in cold-mix paving products. Of course, in such products, it must serve as a bond between the individual particles of the aggregate but, in order to give the most highly desirable cold-mix paving product, bitumen should be adhesive, stable, and fluid, and should exclude water. The bitumen must be adhesive so that it may adhere at all points to the aggregate to which it is applied, or else the aggregate and bitumen will fall away from each other into a heterogeneous, disintegrated mass having no value as a road structure. The bitumen or bituminous cement must also be stable or the road structure will shove, rut and wave with an increasing plasticity until it can no longer be used by traffic. On the other hand, the bitumen or bituminous cement should be fluid during construction so as to permit the shoveling, raking, screeding and other manipulation of the paving material, prior to the application of pressure thereto to cause it to set up to form the finished road structure, and, finally, the bitumen must exclude water so that the resulting structure is water-proof, because the penetration of water into the structure is very objectionable and may be characterized as the worst enemy of all paving structures.

Unfortunately, there is no bitumen which, in itself, combines each of these required characteristics in high degree. Some grades of bitumen are so adhesive that neither temperature nor moisture can separate the bitumen from the aggregate, but such bitumens have little or no stability. Other grades of bitumen are sufficiently stable to withstand traffic stresses, but they are fluid only when hot and cannot be used by themselves as the bonding material of a product of the cold-mix type. Still other grades of bitumen have ample fluidity so as to allow ready manipulation or working of the material prior to set-up, but they are entirely lacking in stability. A high value in one required characteristic could, therefore, under the prior art, only be had by sacrificing needed values in other characteristics. As a result, refiners and road-builders were forced to compromise by using grades of bitumen having some of each required property, but lacking high value in any. The use, by itself, of bitumen of this compromise grade, as a bonding material in a cold-mix product, has proven unsuccessful.

One of the leading objects of my invention, therefore, is to provide a paving material or road-surfacing composition using a bonding material for the aggregates of bituminous character but having the maximum adhesion, stability, and liquidity prior to set-up, and the maximum power of excluding water. In other words, one of the leading objects of my invention is to provide a road-surfacing composition consisting of aggregate coated with a bonding material, which bonding material is made up of bitumens of different characteristics applied where the characteristic is most needed and yet co-acting to form a bituminous bonding agent that provides maximum adhesion to the aggregate, maximum stability of the bonding agent as a whole, maximum fluidity or workability of the particles of the aggregate prior to set-up, and maximum ability to exclude water after the composition or the paving material has been set up or amalgamated by the application of pressure thereto.

One of the defects of cold-mix paving materials of the bituminous type, as manufactured under the prior art, is that they are exceeding difficult to manipulate or work as compared with the hot-mixers. The reason for this is that the workability depends upon the fluidity of the bituminous bonding agent and, under the prior art, any attempt to increase the fluidity of the bonding agent resulted in a decreased stability so that it was impossible to produce a bituminous bonding agent which was both fluid and stable. This lack of workability of the paving material prevented good construction, diminished the value of the completed pavement and added greatly to the cost. An object of my present invention, therefore, is to provide a paving material of the cold-mix type having largely increased workability at ordinary atmospheric temperatures.

Some cold-mixing materials of the prior art made use of cut-back bitumens as the bonding agent, that is to say, they employed as a bonding agent, bitumens having considerable stability, but made fluid by mixing or cutting-back with highly volatile naphthas. These volatiles must evaporate and escape from the product before the original stability can return to the bitumen and, therefore, the pavement as laid must be sufficiently open in texture to allow this escape of these volatile naphthas and, hence, it must also be sufficiently open to allow the entrance of water to a damaging degree which accounts for the failure of many pavements constructed of cold-mix paving materials of the cut-back type. It is an object of my invention, therefore, to provide a cold-mix paving material which does not depend upon the presence of volatiles for its workability at ordinary atmospheric temperatures, and which will not permit the penetration of water.

It has also been proposed to impart fluidity to stable bitumens by emulsifying them in water but, many of these emulsions break too soon or too late, and others fail to adhere to the aggregate, thus accounting for many failures with this type of paving material. It is an object of my invention, therefore, to provide a cold-mix paving material which does not depend upon the emulsification of bitumen in water to impart fluidity to the bonding agent and workability of the mass prior to set-up.

Cold-mix paving material of the dense type has also been proposed, that is to say, a material in which the voids are filled with finely divided aggregate. Such paving materials, however, are too dense to allow the escape of volatiles and, therefore, if bonded with cut-backs their time of final set-up is remote and uncertain. Moreover, the paved surface produced by the use of cold-mix paving material of the dense type is much too slippery to be safe or acceptable for modern traffic. It is an object of my present invention, therefore, to provide a cold-mix road-surfacing composition which does not include finely divided aggregate for filling the voids of the structure.

In my prior U. S. Patent, No. 1,845,405, I have disclosed a road-surfacing composition, and the method of making the same, having very many desirable characteristics, but the composition and method of my present invention is a decided improvement over that of my said patent, because the material may be manufactured ready for laying at a lower cost and has a greater mobility or workability than the material of said patent, while the application of pressure to the material, when spread in place, results in the formation of a pavement of exceedingly tough, durable, malleable, and wear-resistant character which prevents absolutely the penetration of water and gives a road surface of a rasp-like surface texture having a high co-efficient of friction between automobile tires and pavement, which non-slip, non-skid feature is retained throughout the economic life of the road structure.

Further objects, and objects relating to details and economies of construction and operation will definitely appear from the detailed description to follow. In one instance, I have accomplished the objects of my invention by the devices and means described in the following specification. My invention is clearly defined and pointed out in the appended claims.

The accompanying drawing is diagrammatic in character and intended to illustrate two coated particles of aggregate before and after the application of amalgamating pressure thereto. In said drawing, Figure 1 represents two particles of aggregate coated in accordance with my present invention, before the application of pressure to amalgamate the bituminous coatings; and Fig. 2 represents the same two particles after the application of amalgamating pressure.

In general, my invention consists in coating the particles of aggregate with a three-ply layer of bitumen having a variable consistency, with bitumen of maximum adhesive properties in contact with the aggregate in the inner ply, bitumen of maximum stability in the intermediate ply, and bitumen of maxium fluidity prior to set-up or amalgamation in the outer ply or layer. Thus, bitumen having the varying required characteristics is provided in this three-ply coating, and bitumen of the desired characteristic is applied where it is most needed. I have, thus, provided a bituminous bonding agent that provides maximum adhesion, stability, fluidity, and water exclusion, all in a three-ply coating acting as a single layer.

In other words, my invention consists in providing aggregate, the individual particles of which are coated with an inner layer of bituminous flux of maximum adhesiveness and fluidity, to which is applied an intermediate layer or coating of bitumen of maximum stability, the latter being covered with an outer or super-coating of bituminous flux having the required fluidity. That is to say, the intermediate coating, comprising the bitumen of the required stability to form a stable bonding agent when the material has been amalgamated or set-up by pressure, is sandwiched between inner and outer bituminous coatings of a fluid character. The fluid outer coating permits the separate coated particles of the aggregate to move readily with respect to each other, thus giving the material workability or mobility so that it may be readily handled, manipulated and spread in place at ordinary atmospheric temperatures. The fluid inner coating covers every portion of the surfaces of the particles of aggregate and adheres closely thereto so that water can not get between this inner coating and the aggregate, and provides a coated surface which is more readily covered by the intermediate coating of stable bitumen. The intermediate layer of stable bitumen becomes amalgamated with the outer and inner coatings when pressure is applied to the material, after it has been spread in position upon the roadway, so that the particles of aggregate are effectively bonded together by a stable bituminous bonding agent and water cannot possibly penetrate this pavement.

In practicing my invention, I first treat my mineral aggregate with a liquid bitumen so processed that it will flow over all the surfaces of every particle of the aggregate, carrying dispersed minute particles of stable liquid bitumen into every pore, crevice, and re-entrant facet. This first step may be termed a preparatory or priming coat, as part of the liquid bitumen is absorbed by the aggregate itself, a portion remaining on the outside of each particle so treated, thus preparing the particles to receive the second coating of heavy bitumen. It is a well known fact that heavy bitumen will flow more freely over a previously coated aggregate. I next apply to these coated particles a second coating of heavy or stable asphalt or bitumen which is applied in close contact to all surfaces of the particles of the aggregate, so that such particles are completely covered with the heavy bitumen in such a way that this covering will ahere to the particles so completely that water is prevented from seeping between the aggregate and the bitumen. This seepage of water between the aggregate and the bitumen causes a type of failure commonly known as "cheesiness". I, next, apply to the coated particles of aggregate a third or outer coating which consists of bituminous flux, substantially free from quick volatiles, and liquid at ordinary atmospheric temperatures. The second and third coatings may be applied as described in my prior patent, No. 1,845,405, but, because of the softening effect of the inner coating on the inner surface of the intermediate layer, I am able to use less of the outer bituminous coating and, when desired, to use a more fluid outer coating, thus providing greater workability without loss in ultimate stability.

For the initial coating of the aggregate, in accordance with my present invention, I may use either a bituminous flux substantially free from quick volatiles, and liquid at ordinary atmospheric temperatures, or a solution or emulsion of heavy stable bitumen in naphtha so formed that the heavy bitumen is broken up into small globules, each surrounded by and floating in the highly fluid naphtha. These dispersed globules, carried by the naphtha as the continuous phase, move quickly over the surface of each particle of the aggregate and enter into, or attach themselves to, the surface at every point of contact therewith. Most of the naphtha is absorbed into the aggregate and there retained but, before being thus absorbed, it softens the inner surface of the intermediate coating of heavier asphalt applied over it sufficiently to dissipate the interface between the two bitumens and provide maximum and complete adhesion between bitumen and aggregate and cohesion between the coatings and layers.

I am aware that it has been proposed, heretofore, to use naphtha to cover aggregate in preparation for applying a coating of bitumen thereto. In fact, I, myself, have experimented with such uses only to find that it was detrimental instead of useful as a means for providing uniform and easy workability of the product. I found that such straight naphtha spread over the aggregate too quickly and penetrated into its surface at every pore or other opening so rapidly that no bitumen from the coating was carried with it. In fact the naphtha occupied the space to the exclusion of the bitumen and prevented perfect adhesion instead of aiding it. I also found that porous aggregate absorbed the bitumen rapidly, while non-porous aggregate excluded it, causing an uneven and detrimental cutting-back of the coating at some places and no cutting-back at all in other places, thus causing a lack of uniformity in workability. This use of free naphtha, therefore, proved detrimental to me as an aid to workability and did not accomplish at all the results which I have been able to obtain by the use of an inner coating made up of an emulsion of heavy stable bitumen in naphtha.

Although, as above set forth, I prefer the use of bitumen dispersed in naphtha for my inner coating, I have found that asphalt dispersed in gas-oil will also serve the same purpose as will a topped crude having an asphaltic base, the purpose of this inner coating, of course, being to secure the highest possible adhesion to the particles of aggregate and an adequate bond between the initial and the intermediate coating.

The following example is given as typical of one embodiment of my invention: I may employ an aggregate consisting of the hard, tough, particles passing a ⅜″ screen and retained on a 10-mesh screen. I find that this offers a good quality and an ideal grading for wearing surfaces. Such aggregates en masse are sufficiently open to provide a high co-efficient of friction between automobile tires and pavement, yet dense enough so that they are water-sealed by the bituminous bonding agent employed in accordance with my present invention. Since there are no fines in this gradation of aggregate to fill the voids, the ultimate amalgamated bitumen forming the bonding agent will be forced to wear so that its rasp-like surface texture will be retained. I place this dry aggregate in a mixing machine capable of agitating the aggregate while it is being sprayed, and then spray this dry aggregate with approximately 1½% by weight of the desired grade of liquid bitumen which, as previously stated, may be a refined flux substantially free of quick volatiles, or it may be an asphaltic cement dissolved with approximately equal parts of gasoline and kerosene. When each particle of the aggregate has been thus coated, I spray them with approximately 3½% by weight of a stable bitumen, such as one having a penetration of from 25 to 40 at 77° F. This heavy asphaltic cement or bitumen is heated to proper fluidity for spraying. Having thus applied the second or intermediate coating of heavy stable bitumen to the particles of the aggregate, I then spray them with approximately 1% by weight of an asphaltic base flux substantially free of quick volatiles, but carrying preferably at least 50% of 100 penetration bitumen at 77° F., which is liquid at ordinary atmospheric temperatures. With this third application the product is ready for immediate use or for storage and later use, and it will be seen that the bituminous coating applied to the particles of the aggregate consists of a sandwich of heavy asphalt lying in between two layers of liquid bituminous material.

It is to be understood that, in the above example, I have given but one preferred gradation of aggregate, and the invention has equal merit when used with finer aggregates as sheet asphalt or coarser aggregates such as black base or asphaltic concrete.

The composition and the method are also highly successful where an emulsion is used in both the inner and outer coatings. While I have mentioned asphalt, broadly, the combination of two grades of light tar, together with an intermediate or second coating of coal-tar product would form the same bituminous sandwich and produces as successful a bituminous pavement and may be used either as a foundation or a wearing surface.

The product, produced as described above, is readily workable whether used immediately or after storage. It contains no volatiles requiring evaporation before set-up. No material amount of amalgamation or set-up will take place between the intermediate coating and the outer coating prior to the application of pressure and, therefore, the fluid outer coating of bituminous flux remains upon the particles of the aggregate, and the material retains its mobility and workability, prior to the application of pressure thereto, with the result that the material may be stored for considerable periods of time, transported for considerable distances and there distributed, spread and leveled into position upon the road bed at ordinary atmospheric temperatures. When the material has been spread and leveled in position to form the road surface, pressure may be applied thereto, as by running a road roller thereover, or by traffic, which causes an amalgamation of the intermediate coating and the inner and outer coatings, producing therefrom a bituminous cement of higher penetration than the intermediate coating and serving as the binder which bonds together the individual particles of the aggregate to form a rigid road surface which is tough, malleable, durable, wear-resisting and water-proof.

The necessary pressure for amalgamating or setting-up the material may be applied, as stated, by a road roller or by traffic, or by mechanical or hand tamping. Because of the high degree of workability of the material prior to the application of pressure, it can be worked into perfect smoothness prior to set-up. After such set-up the resulting pavement is tough, long-lived, water-proof, non-skid and in every way satisfactory for motor traffic. I have, therefore, through utilizing separate valuable qualities found only in separate grades of bitumen, been able to combine those valuable qualities in a single binding medium of variable consistencies in such a manner as to use each quality to its highest degree.

It will thus be seen clearly that I have taken a decided step in advance over the prior art, which resides in the application of an inner or first coating of a liquid bitumen, a part of which is absorbed by the aggregate itself and to which is applied a second or intermediate coating of heavier bitumen followed by the outer or super-coating of liquid bitumen. I have thus, as stated, partially water-proofed the aggregates in the first step and have then formed a sandwich of the stable bitumen between the two layers of liquid bitumen so that the material is capable of workability in its highest degree, as the term is applied to such bituminous mixture. Under the stress of traffic, or the weight of the road roller, amalgamation takes place between the intermediate coating of heavy asphalt or bitumen, the outer or super-coating of liquid bitumen, and that portion of the first coating of liquid bitumen lying immediately on the face of each particle of the aggregate. The result of such amalgamation is that the particles of the aggregate are effectively bonded together by stable bitumen which adheres so closely to the individual particles of the aggregate that no water can penetrate.

Each particle of the aggregate carries a three-ply layer of bitumen having unique properties because of the variable penetration or consistency prevailing from the inner to the outer surface of that three-ply layer. The thin inner coating, or ply, provides maximum adhesion between aggregate and bitumen and is made up of a grade of bitumen which provides that property at the point where it is most needed. The thicker intermediate coating, or ply, provides maximum resistance to the shearing and impact stresses of traffic, where maximum stability under such stresses is required, and is made up of a grade of bitumen which furnishes such maximum stability. The outer coating, or ply, serves the dual purpose of high initial fluidity, to allow ready workability of the material, and capability of amalgamating under pressure with the intermediate coating, in such amalgamation losing its fluidity and providing a stable bituminous cement of the desired quality.

Although each particle of the aggregate is thus covered with a three-ply layer of bitumen, it adjoins another particle in the mass which is also covered with a three-ply layer, and the two particles are thus separated by a six-ply layer of bitumen, each layer of which is in full contact with each adjacent layer without separator of any kind, thereby utilizing the full affinity and surface tension existing between hydrocarbons of the character used so that the interface between each layer disappears and the whole six plies become a single layer of the varying consistencies named. I am thus able to utilize a variable consistency in such a manner that my product profits by qualities that would be detrimental under the prior art.

What I have just stated may be understood more fully from the annexed drawing. The particles 1 and 2 each have applied thereto the inner coating 3 of liquid bitumen, or bituminous flux or emulsion, the intermediate coating 4 of heavy stable asphalt or bitumen, and the outer coating 5 of bituminous flux. The two particles contact, as shown in Fig. 1, at the point 6 and it will be noted, at that point, the particles of aggregate are separated by the six layers of bituminous cement of varying characteristics and consistencies.

Referring to Fig. 2, which illustrates the same two particles after amalgamating pressure has been applied thereto, it will be seen that the particles have now been forced into contact with each other at 6 and that the six layers of bituminous cement which formerly separated them have been squeezed out laterally on every side around the point of contact, thus filling the smaller voids between particles so as to perfect a water-seal and prevent the penetration of water. This squeezing aside of the bituminous cement results in the amalgamation of the intermediate coating with the more fluid outer and inner coatings, forming a bituminous cement of greater penetration than the intermediate layer, which constitutes the bonding agent between the particles of aggregate. It should be noted also that amalgamation is effected between the particles where pressure is greatest and, at all other places, where there is no pressure, there is no amalgamation but a reserve of unamalgamated bitumen is provided ready to amalgamate and set-up when wear on the pavement causes the two particles to shift their relative positions so that pressure and contact result at other points.

One of the very great advantages of the road surfacing composition of my invention is its increased workability at ordinary atmospheric temperatures. In fact, my invention has resulted from my search for improved workability and a means of attaining it. I realize that the term "workability" is a relative one, and I know of no yard-stick by which the degree of workability may be exactly measured. By this term, I mean the degree of ease with which the material may be shoveled, raked, screeded, luted, compacted, or otherwise manipulated, after manufacture and prior to the application of pressure thereto to cause amalgamation, and set-up. Due to the fact that the cost of handling varies inversely as the workability, this may be taken as indicating the degree of workability. I have noted that ten men using hand shovels unloaded a 50-ton car of cold-mix paving material, manufactured under the prior art, in eight hours, while the same ten men in the same manner unloaded a like amount of the material made in accordance with my present invention in four hours. This indicates a 100% difference in workability, which is a very important factor.

In my prior patent, No. 1,845,405, the coating of heavy stable bitumen was applied directly to the particles of the aggregate and this required not only that the heavy bitumen should be heated, but that the aggregate should be heated also. In accordance with my present invention, where the aggregate is first coated with liquid bitumen, it is only important that the aggregate should be dry and it is not necessary to heat it in order to get a complete and thorough coverage by the bitumen. This renders the production of the material of my present invention simpler and less expensive than that disclosed in my prior patent above mentioned. However, I do not wish it to be understood from the foregoing that heating of the aggregate is unnecessary in all instances. I believe that it is unnecessary when dealing with the coarser aggregates, for instance, aggregates that will not pass through a 10 mesh screen. However, my invention is also useful in connection with finer aggregates such as are used in asphaltic concrete, sheet asphalt and the like, containing materials well below the 10 mesh in gradation, extending down to 200 mesh. In such instances, I believe it desirable to heat the aggregate, first, in order that it may be dry and, second, because I believe a heated aggregate is essential, not for the application of the inner coating but in order that the second or intermediate coating of heavy bitumen may be uniformly applied to so fine an aggregate.

I am aware that the composition and method herein described are susceptible of considerable variation without departing from the spirit of my invention and, therefore, I claim my invention broadly as indicated by the appended claims.

What I claim is:

1. The method of preparing a mobile and workable road-surfacing material, which can be laid cold and set to form a paved, wear-resisting, water-excluding roadway by application of pressure at ordinary atmospheric temperatures, consisting in applying an inner bituminous coating liquid at atmospheric temperature to the individual particles of a mineral aggregate, directly applying to such coated particles an intermediate coating of stable bituminous cement, and then directly applying to such coated particles an outer coating of a bituminous flux, devoid of light volatile matter, fluid at atmospheric temperature, and capable of amalgamation with the intermediate coating to form a bituminous cement of higher penetration than said intermediate coating.

2. The method of preparing a mobile and workable road-surfacing material, which can be laid cold and set to form a paved, wear-resisting and water-excluding roadway by application of pressure at ordinary atmospheric temperatures, consisting in applying to individual particles of a mineral aggregate a three-ply bituminous coating of varying consistency comprising an intermediate layer of stable bituminous cement sandwiched between inner and outer layers of bituminous material liquid at atmospheric temperatures.

3. The method of preparing a mobile and workable road-surfacing material, which can be laid cold and set to form a paved wear-resisting and water-excluding roadway by application of pressure at ordinary atmospheric temperatures, consisting in applying directly to the individual particles of a mineral aggregate an inner coating of a bituminous flux, liquid at atmospheric temperatures, directly applying to such coated particles an intermediate coating of stable bituminous cement, and then directly applying to such coated particles an outer coating of a bituminous flux, liquid at atmospheric temperatures, said inner and outer coatings being capable of amalgamation with the intermediate coating to form a bituminous cement of higher penetration than the intermediate coating.

4. The method of preparing a mobile and workable road-surfacing material, which can be laid cold and set to form a paved, wear-resisting and water-excluding roadway by application of pressure at ordinary atmospheric temperatures, consisting in applying directly to the individual particles of a mineral aggregate an inner coating of a bituminous emulsion in which bitumen is dispersed in a volatile hydrocarbon, directly applying to such coated particles an intermediate coating of stable bituminous cement, and then directly applying to such coated particles an outer coating of a bituminous flux, liquid at atmospheric temperatures, and capable of amalgamation with the intermediate coating to form a bituminous cement of higher penetration than said intermediate coating.

5. A mobile and workable road-surfacing material, which can be laid cold and set to form a paved roadway by application of pressure at ordinary atmospheric temperatures, consisting of a mineral aggregate the individual particles of which have an inner bituminous coating liquid at atmospheric temperatures, an intermediate coating of stable bituminous cement applied directly to said inner coating, and an outer coating, applied directly to said intermediate coating, of a bituminous flux, devoid of light volatile matter, fluid at such atmospheric temperatures, and capable of amalgamation with said intermediate coating to form a bituminous cement of higher penetration than said intermediate coating.

6. A mobile and workable road-surfacing material, which can be laid cold and set to form a paved roadway by application of pressure at ordinary atmospheric temperatures, consisting of a mineral aggregate the individual particles of which have directly applied thereto a three-ply bituminous coating of varying consistency comprising an intermediate layer of stable bituminous cement sandwiched between inner and outer layers of bituminous material liquid at such atmospheric temperatures.

7. A mobile and workable road-surfacing material, which can be laid cold and set to form a paved roadway by application of pressure at ordinary atmospheric temperatures, consisting of a mineral aggregate the individual particles of which have an inner coating of a bituminous flux, liquid at such atmospheric temperatures, an intermediate coating of stable bituminous cement directly applied to said inner coating, and an outer coating, directly applied to said intermediate coating, of a bituminous flux, liquid at such atmospheric temperatures, said inner and outer coatings being capable of amalgamation with the intermediate coating to form a bituminous cement of higher penetration than said intermediate coating.

8. A mobile and workable road-surfacing material, which can be laid cold and set to form a paved roadway by application of pressure at ordinary atmospheric temperatures, consisting of a mineral aggregate the individual particles of which have an inner coating of a bituminous emulsion in which bitumen is dispersed in a volatile hydrocarbon, an intermediate coating of stable bituminous cement directly applied to said inner coating, and an outer coating, directly applied to said intermediate coating, of a bituminous flux, liquid at atmospheric temperatures, and capable of amalgamation with the intermediate coating to form a bituminous cement of higher penetration than said intermediate coating.

SAM E. FINLEY.